(12) United States Patent
Licato et al.

(10) Patent No.: US 8,155,466 B2
(45) Date of Patent: Apr. 10, 2012

(54) METHODS AND APPARATUS FOR REDUCING NOISE IN IMAGES

(75) Inventors: Paul E. Licato, Wauwatosa, WI (US); Saad Ahmed Sirohey, Pewaukee, WI (US); Tamanna Nanavaty Bembenek, Milwaukee, WI (US); Max Wintermark, San Francisco, CA (US)

(73) Assignee: General Electric Company, Schenectady, NY (US)

( * ) Notice: Subject to any disclaimer, the term of this patent is extended or adjusted under 35 U.S.C. 154(b) by 1065 days.

(21) Appl. No.: 12/046,354

(22) Filed: Mar. 11, 2008

(65) Prior Publication Data

US 2009/0232373 A1 Sep. 17, 2009

(51) Int. Cl.
*G06K 9/40* (2006.01)
(52) U.S. Cl. ........ 382/254; 382/260; 382/274; 382/275; 358/3.26; 358/3.27; 358/463
(58) Field of Classification Search .................. 382/260, 382/274, 275; 358/3.26, 3.27, 463
See application file for complete search history.

(56) References Cited

U.S. PATENT DOCUMENTS

| | | | |
|---|---|---|---|
| 6,348,793 B1 | 2/2002 | Balloni et al. | |
| 6,661,228 B2 | 12/2003 | Haworth et al. | |
| 6,697,660 B1 * | 2/2004 | Robinson | 600/409 |
| 6,741,672 B2 | 5/2004 | Gaddipati et al. | |
| 6,819,952 B2 * | 11/2004 | Pfefferbaum et al. | 600/410 |
| 6,879,715 B2 * | 4/2005 | Edic et al. | 382/132 |
| 7,020,868 B2 | 3/2006 | Debbins et al. | |
| 7,054,474 B1 * | 5/2006 | Krieger | 382/128 |
| 7,071,691 B2 * | 7/2006 | Lendi et al. | 324/309 |
| 7,079,555 B2 * | 7/2006 | Baydar et al. | 370/532 |
| 7,304,308 B2 * | 12/2007 | Cheung et al. | 250/370.09 |
| 7,327,141 B2 * | 2/2008 | Jung et al. | 324/309 |
| 7,358,502 B1 * | 4/2008 | Appleby et al. | 250/370.14 |
| 2005/0063575 A1 | 3/2005 | Ma et al. | |
| 2006/0013458 A1 | 1/2006 | Debbins et al. | |
| 2007/0010731 A1 | 1/2007 | Mistretta | |

FOREIGN PATENT DOCUMENTS

| | | |
|---|---|---|
| WO | WO 02/42987 A2 | 5/2002 |
| WO | WO 2006/119164 A2 | 11/2006 |
| WO | WO 2007/008528 A2 | 1/2007 |

* cited by examiner

*Primary Examiner* — Yosef Kassa
(74) *Attorney, Agent, or Firm* — The Small Patent Law Group; Dean D. Small

(57) ABSTRACT

A method for enhancing images of an object includes registering a fixed image with cine images of the same object. Next, the fixed image and the cine images are transformed into frequency space representations thereof. A central portion of the frequency space cine images are merged with a peripheral portion of frequency space fixed image using a defined normalized response curve or a predefined normalized response curve (or both) to form a merged image. Finally, the method includes inversely transforming the merged image into enhanced cine images of the object.

20 Claims, 5 Drawing Sheets

METHODS AND APPARATUS FOR REDUCING NOISE IN IMAGES

BACKGROUND OF THE INVENTION

This invention relates generally to imaging methods and apparatus, and more particularly to methods and apparatus for noise reduction in images. The inventive methods and apparatus described herein are particularly useful for computed tomographic (CT) imaging, and more particularly, CT perfusion imaging, but can be used with other types of images that are not necessarily CT images or medical images.

CT perfusion is an imaging technique wherein an intravenously injected contrast agent, such as a radio-opaque iodine chelate, is observed in images as the agent passes through the tissue. Cine CT imaging can provide a continuous image acquisition similar to a movie for viewing the contrast agent within the tissue. This technique usually requires an examination that lasts 45-50 seconds. Usually, a multislice detector about eight 5 mm continuous slices over a region of interest, such as a brain. When the data is obtained, the data looks like a movie, and the motion of the contrast agent can be seen as the agent passes through vessels. The vessels and tissue are also enhanced as a function of time. Maps can thus be produced that show quantitative measurements of blood flow, blood volume and transit time throughout the brain. These maps can be used by clinicians along with established techniques to assess a stroke or vascularization of, for example, a tumor.

Because a cine CT perfusion acquisition exam takes a relatively long time (typically 45-50 seconds), the technique is adjusted to provide the lowest possible x-ray dose. Accordingly, the image quality of a CT perfusion time series has a poorer signal-to-noise ratio (SNR) when compared to a CT contrast angiogram. The CT contrast angiogram is acquired using a helical acquisition. Thus, each slice acquisition is a type of snapshot, but the CT angio scan may take several seconds. The snapshot can be acquired rapidly without a lengthy x-ray dose, and thus can have a higher SNR than a CT perfusion time series image.

In magnetic resonance imaging, elliptic centric imaging acquires data in frequency space (which can be an image frequency space, for example, a k-space) directly. Every view that is acquired is a coordinate or line in frequency space, for example, starting at the y-axis in the center, or the origin. Elliptic centric acquisition is acquired over time, one point after another, for example, in successive points parallel to an axis or in a spiral from the origin when the contrast agent in the body is in the arterial phase. An acquisition is typically 15-20 seconds long. At about 5 seconds, the contrast bolus has already passed through the tissue and is already in the veins. The veins are relatively larger structures than other structures in the region of interest. The region of interest also has structures that have higher spatial frequencies. If it is known that there are no signals coming from large venous structures, the signals would not contribute to an elliptic centric image because the venous structures have most of the frequencies in the center of frequency space, which is filtered out. Thus, a relatively lengthy (15-20 second) image can be acquired with contrast injection. Because of the manner in which frequency space is acquired over time, this image looks like an artery image without veins, which are not enhanced. This technique can be used to obtain a good arteriogram free of venous contamination because of the manner in which frequency space is sampled relative to the timing of the contrast.

BRIEF DESCRIPTION OF THE INVENTION

In one aspect, some embodiments of the present invention provide a method for enhancing images of an object. The method includes registering a fixed image with cine images of the same object. Next, the fixed image and the cine images are transformed into frequency space representations thereof. A central portion of the frequency space cine images are merged with a peripheral portion of frequency space fixed image using a defined normalized response curve or a predefined normalized response curve (or both) to form a merged image. Finally, the method includes inversely transforming the merged image into enhanced cine images of the object.

In another aspect, some embodiments of the present invention provide an imaging apparatus having a radiation source, a detector array configured to receive radiation from the radiation source including radiation passing through an object to be imaged, a data acquisition system operably coupled to the detector array to receive image data from the detector array, a computer configured to process the received image data, and a display operatively coupled to the computer to display the processed image data. The imaging apparatus is configured to acquire a fixed image and cine images of an object, register the fixed image with the cine images, transform the fixed image and the cine images into frequency space representations thereof, merge a central portion of the frequency space cine images with a peripheral portion of the frequency space fixed image using a normalized response curve to form merged images (in k-space, or more generally, in frequency space), inverse transform the merged images into enhanced cine images of the object; and display the enhanced cine images on a display.

In yet another aspect, some embodiments of the present invention provide a machine readable medium or media having recorded thereon instructions configured to instruct a computer to perform one or more method embodiments of the present invention.

DETAILED DESCRIPTION OF THE INVENTION

Figure 1:
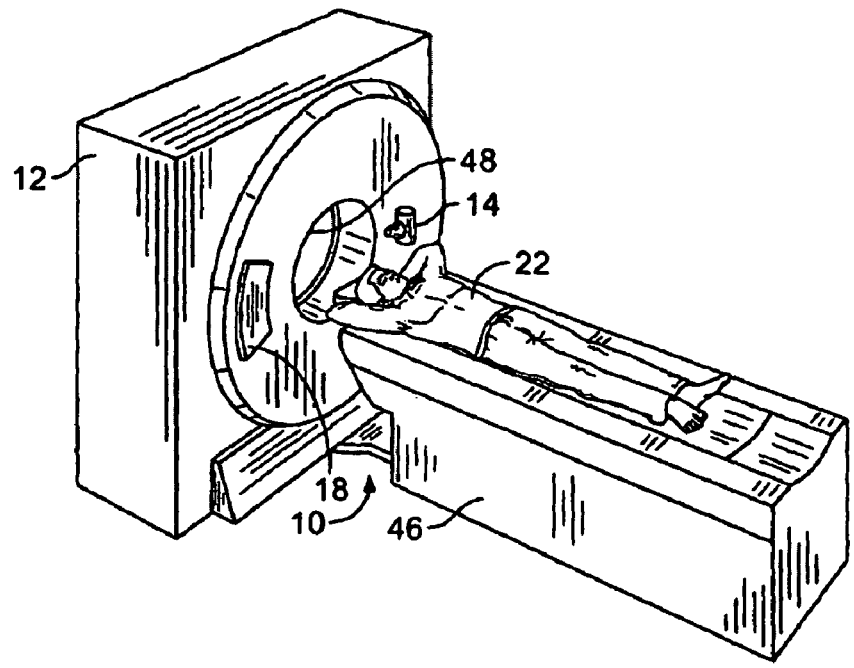
FIG. 1 is a pictorial diagram of a CT imaging apparatus embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings, nor are the figures necessarily drawn to scale.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. Additionally, the recitation of a particular number of elements does not exclude embodiments having more than that particular number, unless the number is further qualified by words such as "exactly" or "only." Also, unless the possibility is either explicitly, logically, or physically excluded, individual features may be omitted from an embodiment, or one or more features from another embodiment or other embodiments, may be combined to produce additional embodiments of the present invention.

Also as used herein, the phrase "reconstructing an image" is not intended to exclude embodiments of the present invention in which data representing an image is generated but a viewable image is not. Therefore, as used herein the term "image" broadly refers to both viewable images and data representing a viewable image. However, many embodiments generate (or are configured to generate) at least one viewable image. Additionally, although described in detail in a CT medical setting, it is contemplated that the benefits accrue to all imaging modalities including, for example, ultrasound, Magnetic Resonance Imaging, (MRI), Electron Beam CT (EBCT), Positron Emission Tomography (PET), Single Photon Emission Computed Tomography (SPECT), and in both medical settings and non-medical settings such as an industrial setting or a transportation setting, such as, for example, but not limited to, a baggage scanning CT system for an airport or other transportation center.

In some known CT imaging system embodiments, a radiation source projects a fan-shaped beam which is collimated to lie within an X-Y plane of a Cartesian coordinate system and generally referred to as an "imaging plane". The radiation beam passes through an object being imaged, such as a patient. The beam, after being attenuated by the object, impinges upon an array of radiation detectors. The intensity of the attenuated radiation beam received at the detector array is dependent upon the attenuation of a radiation beam by the object. Each detector element of the array produces a separate electrical signal that is a measurement of the beam attenuation at the detector location. The attenuation measurements from all the detectors are acquired separately to produce a transmission profile.

In third generation CT systems, the radiation source and the detector array are rotated with a gantry within the imaging plane and around the object to be imaged such that an angle at which the radiation beam intersects the object constantly changes. A group of radiation attenuation measurements, i.e., projection data, from the detector array at one gantry angle is referred to as a "view". A "scan" of the object includes a set of views made at different gantry angles, or view angles, during one revolution of the radiation source and detector.

In an axial scan, the projection data is processed to reconstruct an image that corresponds to a two dimensional slice taken through the object. One method for reconstructing an image from a set of projection data is referred to in the art as the filtered backprojection technique. This process converts the attenuation measurements from a scan into integers called "CT numbers" or "Hounsfield units", which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a fan beam helical scan. The helix mapped out by the fan beam yields projection data from which images in each prescribed slice may be reconstructed.

Figure 2:
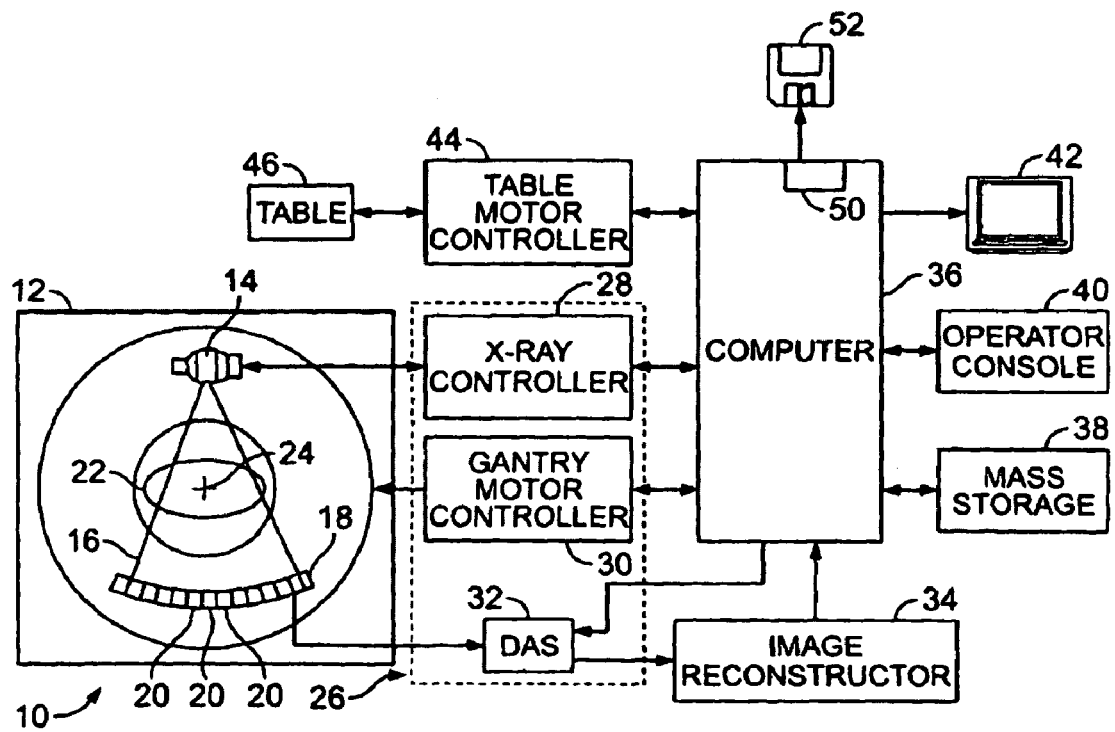
FIG. 2 is a pictorial block diagram of the CT imaging apparatus embodiment of FIG. 1.

FIG. 1 is a pictorial view of a CT imaging system 10. FIG. 2 is a block schematic diagram of system 10 illustrated in FIG. 1. In the exemplary embodiment, a computed tomography (CT) imaging system 10, is shown as including a gantry 12 representative of a "third generation" CT imaging system. Gantry 12 has a radiation source 14 that projects a cone beam 16 of X-rays toward a detector array 18 on the opposite side of gantry 12.

Detector array 18 is formed by a plurality of detector rows (not shown) including a plurality of detector elements 20 which together sense the projected X-ray beams that pass through an object, such as a medical patient 22. Each detector element 20 produces an electrical signal that represents the intensity of an impinging radiation beam and hence the attenuation of the beam as it passes through object or patient 22. An imaging system 10 having a multislice detector 18 is capable of providing a plurality of images representative of a volume of object 22. Each image of the plurality of images corresponds to a separate "slice" of the volume. The "thickness" or aperture of the slice is dependent upon the thickness of the detector rows.

During a scan to acquire radiation projection data, gantry 12 and the components mounted thereon rotate about a center of rotation 24. FIG. 2 shows only a single row of detector elements 20 (i.e., a detector row). However, multislice detector array 18 includes a plurality of parallel detector rows of detector elements 20 such that projection data corresponding to a plurality of quasi-parallel or parallel slices can be acquired simultaneously during a scan.

Rotation of gantry 12 and the operation of radiation source 14 are governed by a control mechanism 26 of CT system 10. Control mechanism 26 includes a radiation controller 28 that provides power and timing signals to radiation source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized radiation data from DAS 32 and performs high-speed image reconstruction. The reconstructed image is applied as an input to a computer 36 which stores the image in a mass storage device 38.

Computer 36 also receives commands and scanning parameters from an operator via console 40 that has a keyboard and/or other user input device(s). An associated display system 42 allows the operator to observe the reconstructed image and other data from computer 36. The operator supplied commands and parameters are used by computer 36 to provide control signals and information to DAS 32, radiation controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

In one embodiment, computer 36 includes a device 50, for example, a floppy disk drive, CD-ROM drive, or DVD-ROM drive, for reading instructions and/or data from a computer-readable medium 52, such as a floppy disk, CD-ROM, or DVD. It should be understood that other types of suitable computer-readable memory are recognized to exist (e.g., CD-RW and flash memory, to name just two), and that this description is not intended to exclude any of these. In another embodiment, computer 36 executes instructions stored in firmware (not shown). Generally, a processor in at least one of DAS 32, reconstructor 34, and computer 36 shown in FIG. 2 is programmed to execute the processes described below. Of course, the method is not limited to practice in CT system 10 and can be utilized in connection with many other types and variations of imaging systems. In one embodiment, computer 36 is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

Some embodiments of the present invention provide a method for improving the image quality of CT perfusion (CTP) imaging using a co-registered CT angiography (CTA) image. A spatial frequency domain transform is applied to each registered image and the low frequency spectrum of the CT angiography images are replaced (or partially replaced) by the low frequency spectrum of the CT perfusion image to create a merged image spectrum in the spectral frequency domain. The merged image spectrum is then transformed back into an enhanced, high-quality hybrid image, which may be used as an enhanced CT perfusion image. Of course, those skilled in the art, upon gaining an understanding of the subject matter disclosed herein, will realize that similar methods and apparatus may also be used to enhance a CTA image with the creation of a 4D CTA.

Figure 3:
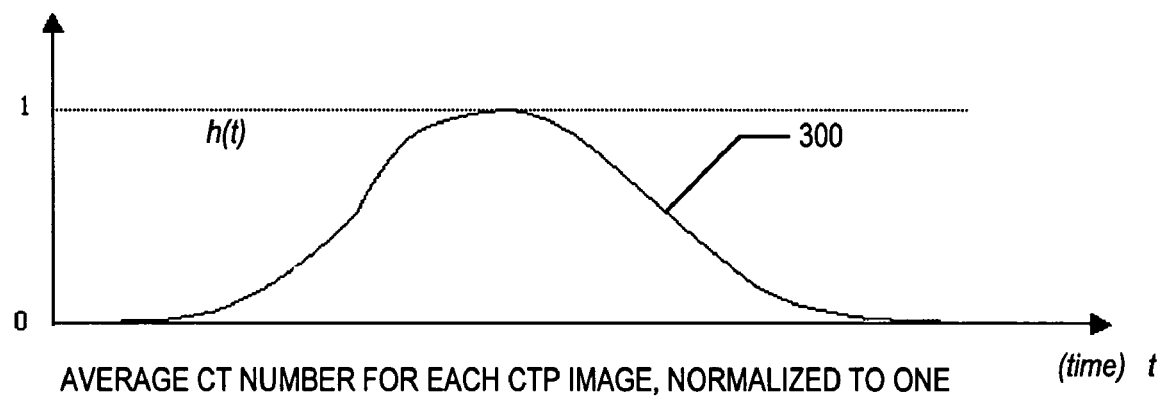
FIG. 3 is a graph of an average CT number for each CT perfusion image normalized to 1, as used in some embodiments of the present invention.

More particularly, in some embodiments of the present invention, the CTA and CTP images are registered. The CTA and CTP images are typically images having the same slice thickness, field of view, and in-plane offset. However, the field of view may be different. Each of the CTP images (obtained from a set of images comprising a cine scan) is looped through in time. In some embodiments, a curve 300 representing a normalized response h(t), such as the example shown in FIG. 3, is determined for each of the CTP images. A 2D fast Fourier transform is then performed on the CTA and CTP images to transform the images into k-space—or more generally, frequency space, which, as used herein, includes k-space within its scope. In these embodiments, h(t) is a normalized radius of a region in the center of the CTP frequency space transformed region. (For example, if an r=20 pixel radius of a circular central region is used, h(t)=1 is defined as the 20 pixel radius, while h(t)=0.5 is defined as a 10 pixel radius. Similar scaling can be defined for other shapes, such as ellipsoids. For example, two functions $h_1(t)$ and $h_2(t)$ could be used for an elliptical central region.) The peak value of 1 for h(t) in some embodiments is defined as occurring during the peak arterial phase of the CT angiogram.

Next, a corresponding region of the CTA frequency space transformed image replaces a central region in each CTP frequency space transformed image. In some embodiments, the replaced region is either circular or elliptical, but there is no requirement that the replaced region necessarily be of either shape. In some embodiments, the replaced region is "partially replaced," for example, a combined, hybrid transformed image is produced by weighting the CTA frequency space transformed image so that the image contributes the most to a central region in the frequency space hybrid transformed image, while the CTP frequency space transformed image is weighted to contribute the most to peripheral regions of the frequency space hybrid transformed image.

In some embodiments of the present invention in which a circular region of the CTA frequency space transformed image replaces a central region in each CTP frequency space transformed image, the normalized response curve 300 h(t) defines a circular region having a radius r=ah(t), where a is a linear scale factor to establish the limits of the circular region, and h(t) is the normalized response curve for the CTP image. (Note that a can also be a function of t in some embodiments, but in many embodiments a is constant.) When h(t) is zero, r is zero, resulting in no contribution from the CTA image. When h(t) is one, the maximum circular region from the CTA image is used, limited by a. Also, in some embodiments of the present invention, the resulting frequency space hybrid transformed image is a 2D inverse fast Fourier transformed to generate a final image.

Technical effects of embodiments of the present invention include an improvement to many types of images, provided registered fixed and cine images of the same object can be obtained or provided. In particular, in the field of CT perfusion imaging, an improved quality CT perfusion image can be obtained, and/or dynamic contrast images can be obtained, which can then be better visualized for assessment of dynamic flow properties. In addition, a low radiation dose can be applied for CT perfusion image acquisition because of the improvement in SNR. Some embodiments may permit dynamic 4D CT angiography that provides diagnostic information comparable to that provided by invasive procedures, such as x-ray angiography.

Figure 4:
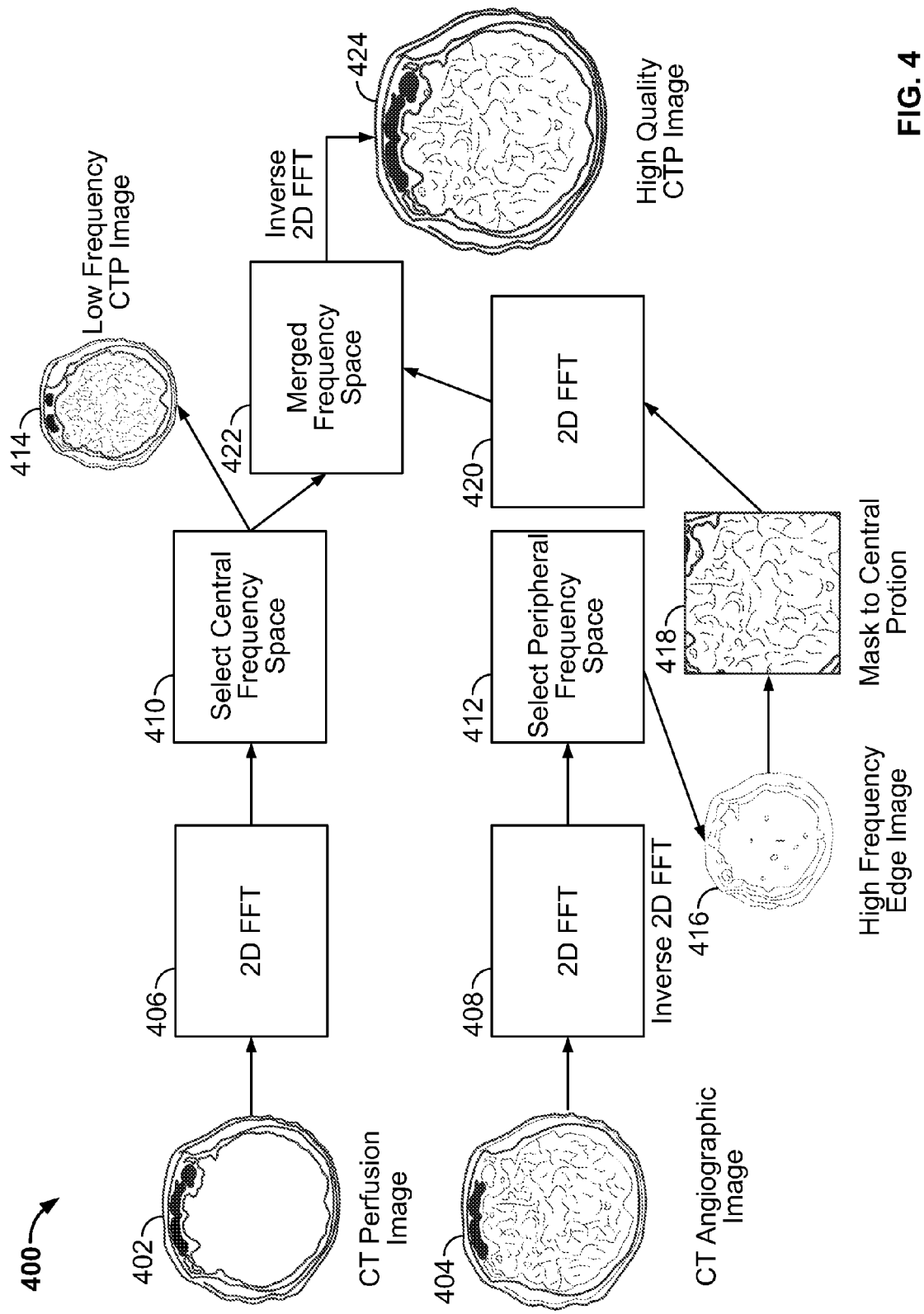
FIG. 4 is a data flow block diagram showing the process to combine a cine image and a static image in some embodiments of the present invention to produce a high quality image.

FIG. 4 is a data flow block diagram showing how a CT perfusion image 402 (a cine image) and a CT angiographic image 404 (a static image) are combined in some embodiments of the present invention. First, 2D fast Fourier transforms (FFTs) 406, 408 are taken of each image, respectfully, to transform the images into frequency space (spatial frequency space). At 410, a central frequency space region of the FFT of the CT perfusion image is selected. A representation of the low frequency CTP image represented by the central frequency space region is shown at 414. Also, at 412, a peripheral frequency space region of the FFT of the CT angiographic image is selected. An inverse 2D FFT is taken of the peripheral frequency space CTA image, resulting in a high frequency edge image at 416. In some embodiments of the present invention, only the central portion image 416 contains angiographic enhancement, so a mask is applied to select the central portion of the image containing possible image enhancements, resulting in image 418. Image 418 is then transformed back into frequency space at 420 by a 2D FFT. The frequency space representations at 410 and 420 are merged at 422, and the inverse 2D FFT of the merged frequency space representation results in the CTP image 424.

It should be noted that the 2D FFT and inverse 2D FFT can be replaced by 3D FFT and inverse 3D FFT respectfully or other suitable transforms, if the images are three dimensional.

Note also that, as used herein, "central frequency space region" includes within its scope pixels of the frequency space transformed image that are near or at zero frequency, or at least distal from the pixels in the transformed image that represent high frequencies. These pixels, in the frequency space transformed image, are near or at the center of the transformed image. The "peripheral frequency space region," as that term is used herein, refers to pixels from the periphery of the transformed image (i.e., the highest spatial frequencies in one or both of the 2D—or, if applicable, 3D—frequency space) to pixels just outside the edges of the central frequency space region.

For example, in some 2D embodiments of the present invention, only one or a small number of pixels are in the central frequency space region, and they may, for example, form a rectangular, square, elliptical, or circular (or nearly circular) region around the point where the zero frequency occurs on both axes in the center of the transformed image. However, other embodiments may have differently shaped boundaries for the central frequency space region and/or larger numbers of pixels in the central frequency space region, and/or a central frequency space region that varies with time and/or is selected by a user. Also, instead of a sharp cut-off between the central frequency space region and the peripheral frequency space region, a weighting function that weights pixels in the central frequency space region with a magnitude substantially larger than the pixels in the peripheral frequency space region may be used. The magnitude may, for example, be approximately 3 dB higher, 6 dB higher, 10 dB higher, or 20 dB higher, to name a few examples, and may be adjustable. Other embodiments using a sharp cut-off utilize a weighting function that is simply either 1 or 0, i.e., on or off.

Figure 5:
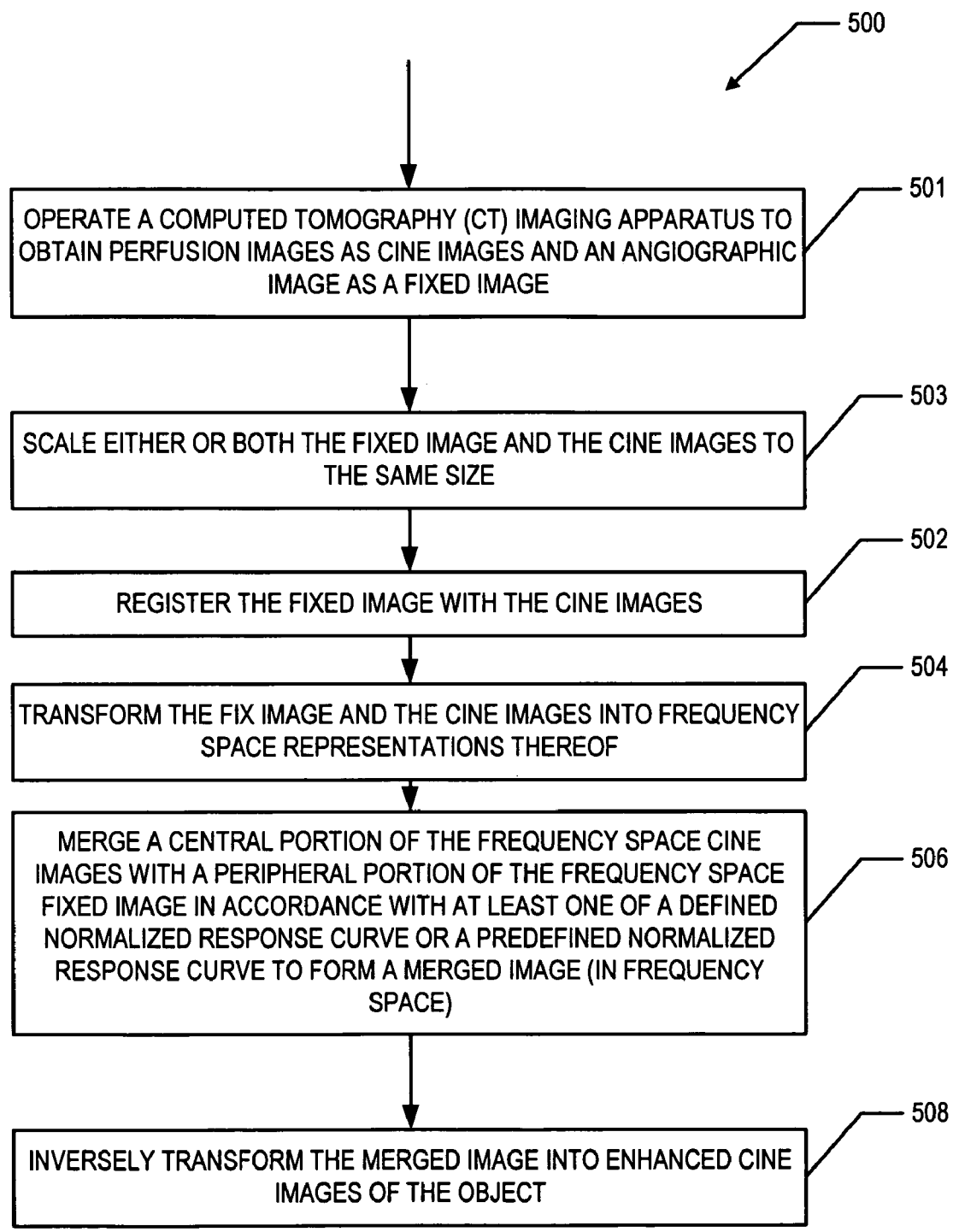
FIG. 5 is a flow chart of various method embodiments of the present invention.

FIG. 5 is a flow chart 500 illustrating various method embodiments of the present invention in which a method for enhancing images of a subject utilizing a computer (such as computer 36) is provided. In some embodiments of the present invention, a computed tomography (CT) imaging apparatus 10 is operated at 501 to obtain perfusion images as the cine images and an angiographic image as the fixed image. However, the present invention is not limited to embodiments in which the cine images and the fixed image are obtained from a CT imaging apparatus 10.

In some embodiments of the present invention, when the fixed image and cine images are of different size, the method includes, at 503, scaling either or both the fixed image and the cine images to the same size. It usually makes little difference which image is scaled (except perhaps in extreme cases in which one image is unusually large or unusually small), so this step is intended to encompass any scaling such that both images become the same size.

The method then includes, at 502, registering a fixed image with cine images of the same object. Next, at 504, the method includes transforming the fixed image and the cine images into frequency space representations thereof and at 506, merging a central portion of the frequency space cine images with a peripheral portion of frequency space fixed image in accordance with at least one of a defined normalized response curve or a predefined normalized response curve to form a merged image. In other words, in some embodiments, the normalized response curve is defined in advance, for example, by a manufacturer of a system or apparatus designed to perform the method. In some embodiments, the normalized response curve is defined by a user prior to (i.e., immediately before) or during the time the method is performed. In yet other embodiments, a choice may be provided as to whether to use a predefined normalized response curve or one that is defined prior to or during the time the method is performed. For example, if the curve of FIG. 3 and a 20 pixel circular radius is the maximum central portion of the frequency space cine image used for merging, the central frequency portion used for merging depends upon time t and is r=ah(t), where a=20. The peripheral region is all of frequency space outside of radius r.

Finally, at 508, the method includes inversely transforming the merged image into enhanced cine images of the object. It is contemplated that this method encompasses both embodiments in which a portion of one frequency space image replaces a central portion of the other frequency space image as well as embodiments in which the frequency space images are weighted and combined in accordance to their weightings.

Figure 6:
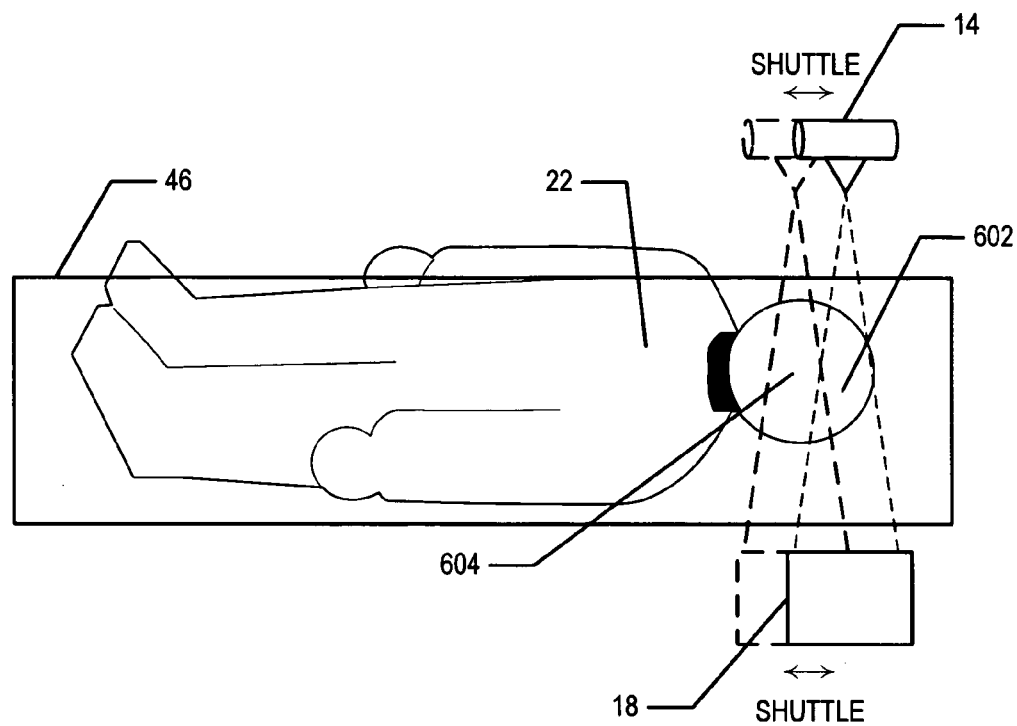
FIG. 6 is a pictorial illustration of a shuttle scan used in some embodiments of the present invention.

In some embodiments of the present invention, a computed tomographic imaging apparatus 10 with an x-ray radiation source 14 and a detector array 18 is utilized to shuttle-scan a plurality of regions 602, 604 (shown in FIG. 6) during a single examination to obtain coverage wider than detector array 18, and a plurality of fixed images are used to register with (and enhance) cine images obtained during the shuttle scan. These shuttle scans are useful in examinations in which the detector array 18 (typically but not necessarily 40 mm) is too small for examining a diseased region of interest. In an ordinary examination, a plurality of scans, each covering a portion of the region of interest, would be taken, thereby increasing the radiation dose to the patient significantly. To reduce dosage, some embodiments of the present invention shuttle the x-ray source and detector back and forth during, for example, a perfusion examination to double the coverage available. Round trip time in shuttling from a completed cine acquisition at region 602 to a complete acquisition at region 604 and back to the beginning of a cine acquisition at region 602 is typically about 2.8 to 3.2 seconds for a modern CT imaging apparatus. Even though gaps of this length would appear within cine images at location 602 and at location 604, these gaps are short enough to allow an acceptable perfusion examination, and the increased SNR made possible with these embodiments of the present invention make possible high quality images at low patient radiation doses. For CT imaging apparatus 10 with even shorter round trip times, it is possible to satisfactorily acquire an even larger number of regions at low patent dosages.

Figure 7:
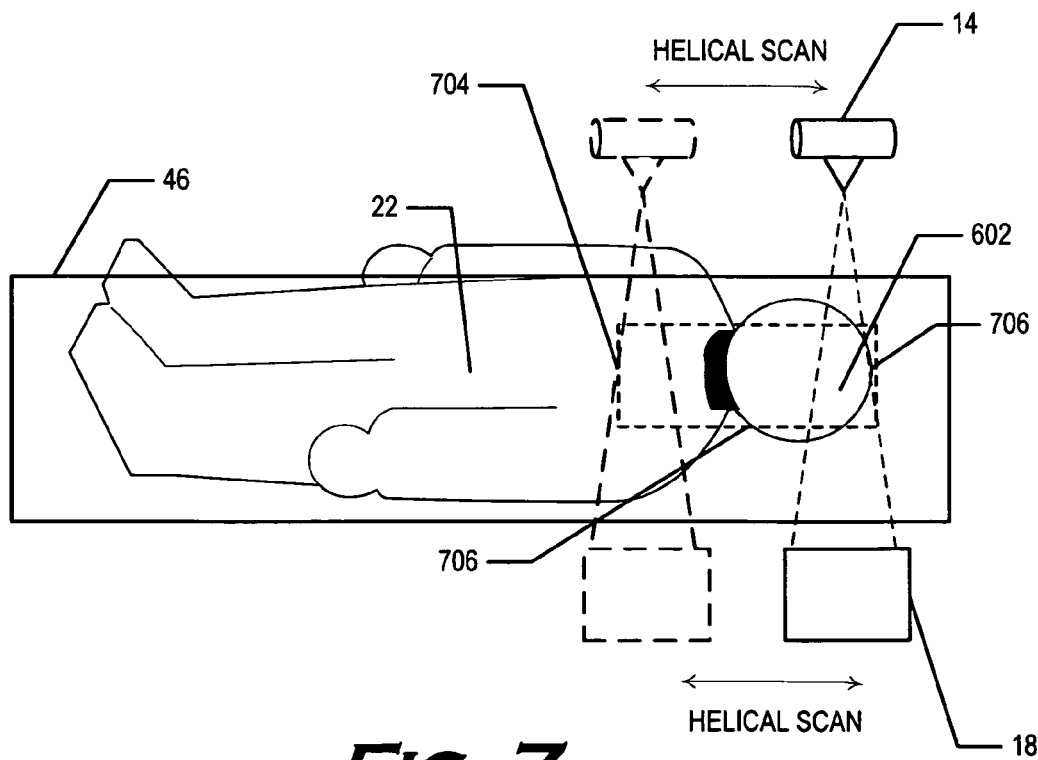
FIG. 7 is a pictorial illustration of a helical scan used in some embodiments of the present invention.

Some embodiments of the present invention utilize a computed tomographic imaging apparatus with an x-ray radiation source and a detector array to helically scan a region of an object during a single examination to obtain coverage wider than the detector array, and utilize a plurality of fixed images to register with cine images obtained during the helical scan. Referring to FIG. 7, a helical scan is a continuous scan between edges 702 and 704 bounding a region of interest 706 of the object 22 being scanned. The helical scan of these embodiments moves detector array 18 and radiation source 14 back and forth across region of interest 706 by moving table 46 and may result in a variable pitch scan due to the stopping and starting of the table. Such a scan may result in an increased dose for a patient over a shuttle scan, but increased coverage may be obtained relative to a shuttle scan at lower doses than are now possible, due to the increased SNR of images made possible in embodiments of the present invention.

Some embodiments of the present invention provide an imaging apparatus 10 having a radiation source 14, a detector array 18 configured to receive radiation from the radiation source including radiation 16 passing through an object 22 to be imaged, a data acquisition system 32 operably coupled to detector array 18 to receive image data from the detector array, a computer 36 configured to process the received image data, and a display 42 operatively coupled to computer 36 to display the processed image data. The imaging apparatus is configured to acquire a fixed image 404 and cine images 402 of the same object, register the fixed image 404 with the cine images 402, transform the fixed image 404 and the cine images 402 into frequency space representations thereof, merge a central portion 410 of the frequency space cine images 404 with a peripheral portion 412 of the frequency space fixed image 404 in accordance with a normalized response curve 300 to form merged images 422 (in frequency space), inverse transform the merged images into enhanced cine images 424 of the object; and display the enhanced cine images on display 42. The apparatus is a computed tomography imaging apparatus 10 in some embodiments of the present invention. Also in some embodiments, the cine images are perfusion images and the fixed image is an angiographic image.

The apparatus is further configured to scale either or both the fixed image 404 and the cine images 402 to the same size in some embodiments. In some embodiments, the transform is a 2D fast Fourier transform (FFT) and the inverse transform is an inverse 2D FFT.

Also, in some embodiments of the present invention, the apparatus is a computed tomographic imaging apparatus 10 with an x-ray radiation source 14 and a detector array 18, and the apparatus is further configured to shuttle-scan a plurality of regions 602, 604 during a single examination to obtain coverage wider than the detector array 18, and to utilize a plurality of fixed images to register with cine images obtained during the shuttle scan. In yet other embodiments, the apparatus is a computed tomographic imaging apparatus 10 with an x-ray radiation source 14 and a detector array 18, and the apparatus is further configured to helically scan a region 706 of an object 22 during a single examination to obtain coverage wider than the detector array 18, and to utilize a plurality of fixed images to register with cine images obtained during the helical scan.

In yet other embodiments of the present invention, a machine-readable medium 52 or set of media 54 (not all of which need be of the same type) is/are provided. The medium or media have recorded thereon instructions configured to instruct a computer 36 to perform one or more method embodiments of the present invention.

It should be understood that, although the embodiments described herein employ frequency space transforms, representations, and inverse transforms, other embodiments may employ k-space transforms, representations, and inverse transforms, and such other embodiments fall within the scope of frequency space transforms, representations and inverse transforms.

It is also to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for enhancing images of a subject, said method comprising:
   registering a fixed image with cine images of an object;
   transforming the fixed image and the cine images into frequency space representations thereof;
   merging a central portion of the frequency space cine images with a peripheral portion of frequency space fixed image using at least one of a defined normalized response curve and a predefined normalized response curve to form a merged image; and
   inversely transforming the merged image into enhanced cine images of the object.

2. The method of claim 1 further comprising operating a computed tomography imaging apparatus to obtain perfusion images defining the cine images and an angiographic image defining the fixed image.

3. The method of claim 1 wherein the cine images comprise perfusion images and the fixed image comprises an angiographic image.

4. The method of claim 1 wherein the transforming comprises using a 2D fast Fourier transform (FFT) and the inverse transforming comprises using an inverse 2D FFT.

5. The method of claim 1 wherein the fixed image and the cine images of the object are 3D images, and the transforming comprises using a 3D fast Fourier transform (FFT) and the inverse transforming comprises using an inverse 3D FFT.

6. The method of claim 1 further comprising utilizing a computed tomographic imaging apparatus with an x-ray radiation source and a detector array to shuttle-scan a plurality of regions during a single examination, and utilizing a plurality of fixed images to register with cine images obtained during the shuttle scan.

7. The method of claim 1 further comprising utilizing a computed tomographic imaging apparatus with an x-ray radiation source and a detector array to helically scan a region of an object during a single examination, and utilizing a plurality of fixed images to register with cine images obtained during the helical scan.

8. An imaging apparatus having a radiation source, a detector array configured to receive radiation from the radiation source including radiation passing through an object to be imaged, a data acquisition system operably coupled to the detector array to receive image data from the detector array, a computer configured to process the received image data, and a display operatively coupled to the computer to display the processed image data, said imaging apparatus configured to:
acquire a fixed image and cine images of an object;
register the fixed image with the cine images;
transform the fixed image and the cine images into frequency space representations thereof;
merge a central portion of the frequency space cine images with a peripheral portion of frequency space fixed image using a normalized response curve to form merged images;
inverse transform the merged images into enhanced cine images of the object; and
display the enhanced cine images.

9. The apparatus of claim 8 wherein the apparatus comprises a computed tomography imaging apparatus.

10. The apparatus of claim 8 further configured to scale at least one of the fixed image and the cine images to the same size.

11. The apparatus of claim 8 wherein the transform comprises a 2D fast Fourier transform (FFT) and the inverse transform comprises an inverse 2D FFT.

12. The apparatus of claim 8 further configured to enhance the fixed image of the object.

13. The apparatus of claim 8 wherein the apparatus is a computed tomographic imaging apparatus with an x-ray radiation source and a detector array, and the apparatus is further configured to shuttle-scan a plurality of regions during a single examination, and to utilize a plurality of fixed images to register with cine images obtained during the shuttle scan.

14. The apparatus of claim 8 wherein the apparatus is a computed tomographic imaging apparatus with an x-ray radiation source and a detector array, and the apparatus is further configured to helically scan a region of an object during a single examination, and to utilize a plurality of fixed images to register with cine images obtained during the helical scan.

15. A non-transitory computer readable storage medium or media having recorded thereon instructions configured to instruct a computer to:
register a fixed image of an object with cine images of the object;
transform the fixed image and the cine images into frequency space representations thereof;
merge a central portion of the frequency space cine images with a peripheral portion of frequency space fixed image using a normalized response curve to form merged images; and
inverse transform the merged images into enhanced cine images of the object.

16. The non-transitory computer readable storage medium or media of claim 15 further having instructions recorded thereon to instruct the computer to scale at least one of the fixed image and the cine images to the same size.

17. The non-transitory computer readable storage medium or media of claim 15 wherein the transform comprises a 2D fast Fourier transform (FFT) and the inverse transform comprises an inverse 2D FFT.

18. The non-transitory computer readable storage medium or media of claim 15 wherein the computer is an operative component of a computed tomographic imaging apparatus, and the instructions recorded on the machine-readable medium or media further comprise instruction configured to instruct the computer to operate the computed tomographic imaging apparatus to acquire the fixed image and the cine images.

19. The non-transitory computer readable storage medium or media of claim 15 wherein the computer is an operative component of a computed tomographic imaging apparatus, and the instructions further include instructions configured to instruct the computer to shuttle-scan a plurality of regions during a single examination to obtain coverage wider than the detector array, and to utilize a plurality of fixed images to register with cine images obtained during the shuttle scan.

20. The non-transitory computer readable storage medium or media of claim 15 wherein the computer is an operative component of a computed tomographic imaging apparatus, and the instructions further include instructions configured to instruct the computer to helically scan a region of an object during a single examination to obtain coverage wider than the detector array, and to utilize a plurality of fixed images to register with cine images obtained during the helical scan.

* * * * *